United States Patent [19]
Luce

[11] 3,852,238
[45] Dec. 3, 1974

[54] FLAME RETARDANT POLYCARBONATE COMPOSITION

[75] Inventor: John B. Luce, Mount Vernon, Ind.

[73] Assignee: General Electric Company, Pittsfield, Mass.

[22] Filed: Oct. 15, 1973

[21] Appl. No.: 406,602

Related U.S. Application Data

[62] Division of Ser. No. 215,155, Jan. 3, 1972, Pat. No. 3,796,772.

[52] U.S. Cl. .................. 260/45.75 R, 260/45.7 R, 260/45.95 G, 260/860
[51] Int. Cl. ............................................. C08f 45/62
[58] Field of Search...... 260/860, 45.75 R, 45.95 G, 260/45.7 R; 117/138

[56] References Cited
UNITED STATES PATENTS

| | | | |
|---|---|---|---|
| 3,311,585 | 3/1967 | Edlin................................ | 117/138 |
| 3,380,847 | 4/1968 | Leoutsacos et al................ | 117/138 |
| 3,775,367 | 11/1973 | Nouvertne ........................ | 252/8.1 |
| 3,786,114 | 1/1974 | Jaquiss et al..................... | 260/45.75 |

*Primary Examiner*—V. P. Hoke
*Attorney, Agent, or Firm*—Donald M. Papuga; William F. Mufatti

[57] ABSTRACT

A flame retardant polymer composition having in admixture therewith certain titanates and halogen containing flame retardant additives.

3 Claims, No Drawings

FLAME RETARDANT POLYCARBONATE COMPOSITION

This application is a division of U.S. Pat. application Ser. No. 215,155, filed Jan. 3, 1972, now U.S. Pat. No. 3,796,772, issued Mar. 12, 1974.

The invention relates to a thermoplastic polymer composition having excellent flame retardant properties and more particularly, polymer compositions having in admixture therewith particular titanates.

BACKGROUND OF THE INVENTION

It is well known in the art to prepare flame retardant polymer compositions such as flame retardant polycarbonates by employing halogen substituted bisphenol-A in the preparation thereof. Specifically, U.S. Pat. No. 3,334,154 discloses such a composition wherein tetrabromobisphenol-A is employed to prepare a polycarbonate composition having excellent flame retardant properties. In addition, other polymers are made flame retardant by adding halogen containing flame retardant additives to such polymers as high impact polystyrenes and acrylonitrile-butadienestyrene terpolymers. Flame retardant properties of thermoplastic compositions are extremely high in demand by the industry as a safety feature requirement. In fact, many applications for thermoplastics carry the requirement that the thermoplastic be flame retardant particularly where they are used by the public or are employed in areas where the public may gather.

With the development and production of supersonic aircraft and other transportation vehicles wherein there is the need for utmost safety for passengers being carried therein, there is a great demand that the materials as supplied therein in the fabrication of such vehicles be flame retardant or nonflammable. Even though a thermoplastic may have flame retardant properties, it will, nevertheless, melt and drip upon exposure to heat. Such dripping can come into contact with combustibles and thereby cause burning of such combustibles. The modes of public transportation being developed are now using extensive amounts of plastic materials because of their high strength to weight ratio and because of the esthetic properties that they can impart to the vehicle. Therefore, the added safety requirements call for plastic materials to exhibit controlled dripping. Many of the flame retardant compositions exhibit severe dripping which is conducive to spreading fire even though such polymers may be classified as flame resistant or flame retardant polymers.

DESCRIPTION OF THE INVENTION

According to this invention, it has now been discovered that by incorporating with a flame retardant polymer certain titanate additives these polymers can be rendered non dripping as in the case of a polycarbonate. More specifically, the polycarbonate composition of this invention consists of a copolymer of an unsubstituted dihydric phenol and a halogen substituted dihydric phenol. Particularly, this preferred system employs a tetra halogen substituted dihydric phenol and more particularly a tetrabromobisphenol-A. The flame retardant polycarbonate composition of this invention consists of the above polycarbonate in admixture with 0.01 2.0 weight percent of calcium titanate.

The halogen containing flame retardant additive may be typically such well known materials as hexabromobenzene, hexachlorobenzene, hexabromobiphenyl, hexachlorobiphenyl, decabromobiphenyl, decachlorobiphenyl, decabromobiphenyl ether, decachlorobiphenyl ether, 2,2-(3,3',5,5'-tetrabromo-4,4'-dihydroxydiphenyl) propane, 2,2-(3,3',5,5'-tetrachloro-4,4'-dihydroxydiphenyl) propane, an adduct of cyclohexane and hexachlorocyclopentadiene (chloran), etc.

The halogens employed in all cases are of either the halogen substituted dihydric phenols or the halogen containing flame retardant additives are bromine or chlorine mixtures thereof in the same compound or monomer.

DESCRIPTION OF THE PREFERRED EMBODIMENT

The following example is set forth herein to illustrate in more detail the preferred embodiment and to illustrate more clearly the principle and practice of this invention to those skilled in the art.

EXAMPLE I

A molding composition is prepared by mixing (a) 1 part of a copolymer prepared by reacting 50 weight percent of 2,2-bis (4-hydroxyphenyl) propane (hereinafter referred to as bisphenol-A), 50 weight percent of 2,2-(3,3',5,5'-tetrabromo-4,4'-dihydroxydiphenyl) propane and phosgene in a methylene chloride reaction medium containing therein p-tertiary butylphenol, pyridine and calcium hydroxide, and (b) 4 parts of a bisphenol-A homopolymer prepared by reacting bisphenol-A with phosgene in a methylene chloride reaction medium containing therein triethylamine, p-tertiary butylphenol and calcium hydroxide. The polymer blend is then mixed with 0.1 weight percent of calcium titanate and extruded at a temperature of about 525° F. The extrudate is comminuted into pellets.

The above composition is then injected molded into test specimens of 5 × ½ × 1/16 inches thick. Test bars are also molded without the calcium titanate added.

The test bars are then subjected to the Underwriters Laboratories (U.L. Bulletin 94 Flame Test). The results are as follows:

TABLE 1

| Additive | Flame Out (Seconds) |
|---|---|
| 0 | 10 sec.* |
| Calcium Titanate (0.1%) | 2-3 sec.** |

*Dripping of the polymer occurred and ignited cotton underlayment.
**No dripping of the polymer occurred.

As shown in the example, the addition of the particular titanate with the flame retardant polymer rendered the polymer either non dripping or if dripping occurred, the dripping did not ignite the combustible material around it. It is the combination of the titanate with the halogen that offers this effect. Without the titanate additive, even the so-called flame retardant polymers caused burning of combustible material due to dripping polymer.

In general, the unsubstituted and halogen substituted dihydric phenols employed herein are the dihydric bisphenols or polynuclear aromatic compounds, containing as functional groups, two hydroxyl radicals, each of which is attached directly to a carbon atom of an aromatic nucleus. Typical of some of the dihydric phenols that may be employed in the practice of this invention are bis(4-hydroxphenyl) methane, 2,2-bis(4-hydroxyphenyl) propane (bisphenol-A), 2,2-bis(4-hydroxy-3-methylphenyl) propane, 4,4-bis (4-hydroxphenyl) heptane, 2,2-(3,3',5,5'-tetrachloro-4,4'-dihydroxy-diphenyl) propane (tetrachlorobisphenol-A), 2,2-(3,3'5,5'-tetrabromo-4,4'-dihydroxy-diphenyl) propane (tetrabromobisphenol-A), 3,3'-dichloro-4,4'-dihydroxyphenyl methane, etc. Other dihydric phenols of the bisphenol type are also available and are disclosed in U.S. Pat. Nos. 2,999,835, 3,028,365 and 3,334,154.

Generally, the polycarbonate employed herein may be prepared by reacting a dihydric phenol with a carbonate precursor in the presence of a molecular weight regulator, an acid acceptor and a catalyst. The preferred carbonate precursor generally employed in preparing carbonate polymers is carbonyl chloride. However, other carbonate precursors may be employed and this includes other carbonyl halides, carbonate esters or haloformates.

The acid acceptors, molecular weight regulators and catalysts employed in the process of preparing polycarbonates are well known in the art and may be any of those commonly used to prepare polycarbonates.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant polymer composition comprising mixtures of a carbonate polymer and 0.01 – 2.0 weight percent of calcium titanate, said polycarbonate composed of a copolymer of an unsubstituted dihydric phenol and halogen substituted dihydric phenol; said halogen being selected from the group consisting of bromine and chlorine.

2. The composition of claim 1 wherein the aromatic polycarbonate is a copolymer of 2,2-bis (4-hydroxyphenyl) propane and 2,2-(3,3',5,5'-tetrachloro-4,4'-dihydroxy-diphenyl) propane.

3. The composition of claim 1 wherein the aromatic polycarbonate is a copolymer of 2,2(4-hydroxyphenyl) propane and 2,2-(3,3',5,5'-tetrabromo-4,4'-dihydroxy-diphenyl) propane.

* * * * *